(12) United States Patent
Chang

(10) Patent No.: US 8,398,286 B2
(45) Date of Patent: Mar. 19, 2013

(54) BACKLIGHT MODULE FOR LIQUID CRYSTAL DISPLAY

(75) Inventor: Ke Chin Chang, HsinChu (TW)

(73) Assignee: Hannstar Display Corp., Taipei County (TW)

( * ) Notice: Subject to any disclaimer, the term of this patent is extended or adjusted under 35 U.S.C. 154(b) by 429 days.

(21) Appl. No.: 12/829,744

(22) Filed: Jul. 2, 2010

(65) Prior Publication Data

US 2011/0002141 A1 Jan. 6, 2011

(30) Foreign Application Priority Data

Jul. 2, 2009 (TW) ................................ 98122514 A

(51) Int. Cl.
*F21V 7/05* (2006.01)
*F21V 7/00* (2006.01)
(52) U.S. Cl. ......... 362/606; 362/608; 362/609; 362/612
(58) Field of Classification Search ........ 362/97.1–97.4, 362/600, 602, 606–609, 611–613, 615, 623, 362/632–634; 349/61
See application file for complete search history.

(56) References Cited

U.S. PATENT DOCUMENTS

| 6,607,286 B2 | 8/2003 | West et al. |
| 6,679,621 B2 | 1/2004 | West et al. |
| 7,438,444 B2 | 10/2008 | Pao et al. |
| 7,441,938 B2 | 10/2008 | Sakai et al. |
| 7,738,053 B2 * | 6/2010 | Kubota ............................ 349/65 |
| 2006/0055843 A1 | 3/2006 | Hahm et al. |
| 2007/0223245 A1 * | 9/2007 | Lee ................. 362/600 |
| 2009/0116261 A1 * | 5/2009 | Chen et al. .................... 362/609 |

FOREIGN PATENT DOCUMENTS

| KR | 20070069490 A | 7/2007 |
| TW | 200710492 | 3/2007 |
| TW | 200736732 | 10/2007 |

* cited by examiner

*Primary Examiner* — Joseph L Williams
*Assistant Examiner* — Nathaniel Lee

(57) ABSTRACT

A backlight module for a liquid crystal display according to the present invention is provided. The backlight module includes a light guide plate, a light source, a first reflection sheet and a second reflection sheet. The light guide plate has an upper surface, a lower surface, and opposing first and second side surfaces. The light source is disposed on the first side surface of the light guide plate and comprises a plurality of point light sources. The first reflection sheet is disposed on the light source and the upper surface of the light guide plate to reflect light beams emitting from the light source to the light guide plate. The first reflection sheet includes a plurality of first portions, a plurality of second portions and a plurality of protrusion portions, wherein the first portions are positioned corresponding to the light source and arranged alternately with the second portions. The protrusion portions extend from the second portions toward the second side surface of the light guide plate. The second reflection sheet is disposed under the lower surface of the light guide plate.

20 Claims, 8 Drawing Sheets

BACKLIGHT MODULE FOR LIQUID CRYSTAL DISPLAY

CROSS REFERENCE TO RELATED APPLICATION

This application claims the priority benefit of Taiwan Patent Application Serial Number 098122514 filed Jul. 2, 2009, the full disclosure of which is incorporated herein by reference.

BACKGROUND OF THE INVENTION

1. Field of the Invention

The invention relates to a backlight module, and more particularly, to an edge type backlight module.

2. Description of the Related Art

Backlight modules of conventional liquid crystal displays use mostly cold cathode fluorescent lamps (CCFLs) as light sources. However, cold cathode fluorescent lamps contain mercury, consume too much power and have short lifetime. Hence, the current trend is toward replacing cold cathode fluorescent lamps with light emitting diodes (hereinafter referred to as LEDs) when designing the light sources of backlight modules. LEDs are durable and contamination-free. Red, green, blue monochromatic LEDs have advantages, such as a single wavelength and a wide color gamut, and thus resultant liquid crystal display (LCD) images are brightly colored and delicately outlined. However, an LED is a point light source and thereby is unlikely to provide uniform illumination for a light emission surface of a backlight module, and in consequence granular hot spots are visible in front of the backlight module.

From an optical point of view, uniform illumination emerges as light travels further away from a point light source. Inasmuch as the appeal of LCDs lies in the compactness thereof, an LCD whose uniform illumination-providing surface source is fabricated at the cost of a thickened backlight module is necessarily bulky and thereby is hardly in line with the trend of LCD products. In order to enhance the practicability of LED backlight modules, U.S. Pat. Nos. 6,607,286, 6,679,621 and 7,438,444 disclose a lens structure configured for lateral emission of LED light with a view to providing uniform illumination.

For example, referring to FIG. 1, U.S. Pat. No. 6,607,286 discloses a lens cap 1 mounted on an LED 2. The lens cap 1 includes a concave inner surface 10 and a serrate outer surface 11. The LED 2 is covered by the inner surface 10 of the lens cap 1. The light beams emitted by the LED 2 penetrate the inner surface 10 before being refracted by the outer surface 11 and then exiting laterally. Among these light beams, oblique beams have to undergo total internal reflection once before being refracted and exiting.

However, the above-mentioned lens cap is of particular shape and therefore expensive.

SUMMARY OF THE INVENTION

The present invention provides a backlight module that can reduce the occurrence of hot spots by changing the shapes of the reflection sheets/reflectors.

In one embodiment, the backlight module of the present invention includes a light guide plate, a light source, a first reflection sheet and a second reflection sheet. The light guide plate has an upper surface, a lower surface, a first side surface and a second side surface opposite to the first side surface. The light source is positioned on the first side surface of the light guide plate and comprises a plurality of point light sources. The first reflection sheet is positioned above the light source and the upper surface of the light guide plate to reflect light beams emitting from the light source to the light guide plate. The first reflection sheet has a plurality of first portions, a plurality of second portions and a plurality of protrusion portions, wherein the first portions are positioned corresponding to the point light sources of the light source and arranged alternately with the second portions, the protrusion portions extend from the second portions toward the second side surface of the light guide plate. The second reflection sheet is positioned under the lower surface of the light guide plate.

In another embodiment, the backlight module of the present invention includes a light guide plate, a light source, a reflector and a reflection sheet. The light guide plate has an upper surface, a lower surface, a first side surface and a second side surface opposite to the first side surface. The light source is positioned on the first side surface of the light guide plate and comprises a plurality of point light sources. The reflector surrounds the light source to reflect light beams emitting from the light source to the light guide plate. The reflector has an upper reflecting surface that is positioned above the light source and the upper surface of the light guide plate. The upper reflecting surface of the reflector has a plurality of first portions, a plurality of second portions and a plurality of protrusion portions, wherein the first portions are positioned corresponding to the point light sources of the light source and arranged alternately with the second portions, the protrusion portions extend from the second portions toward the second side surface of the light guide plate. The reflection sheet is positioned under the lower surface of the light guide plate.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
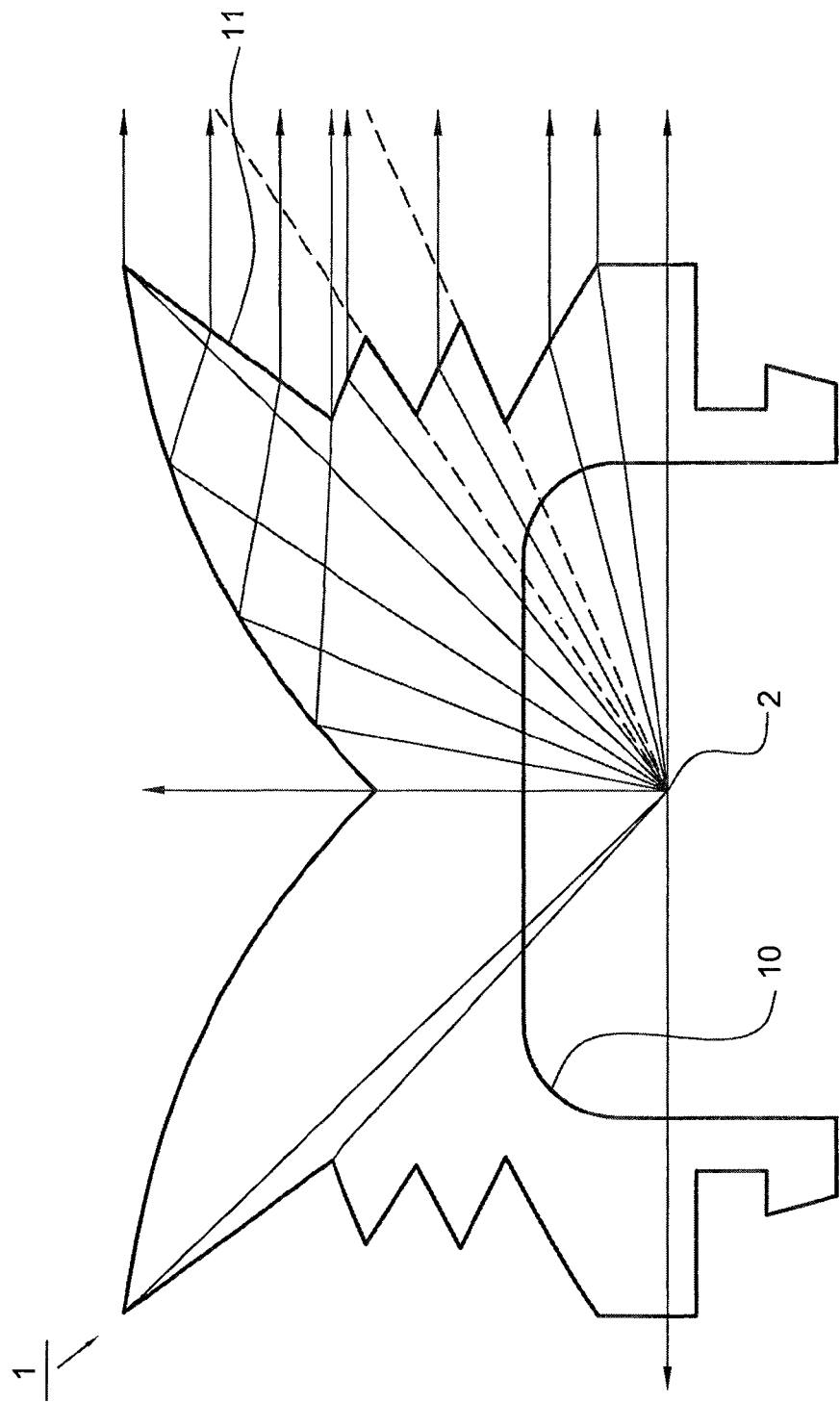
FIG. 1 is a schematic diagram of a conventional lens cap.
Figure 2:
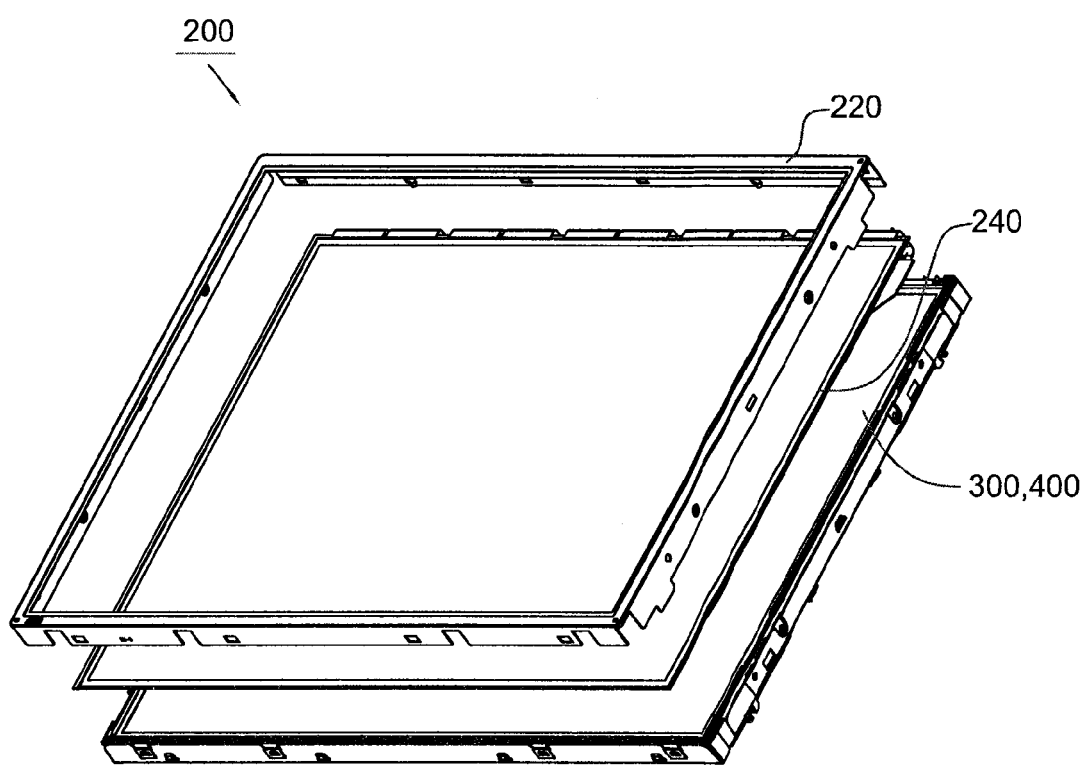
FIG. 2 is a schematic, elevated perspective view of a conventional liquid crystal display.

Referring to FIG. 2, the liquid crystal display 200 of the present invention mainly includes a front frame 220, a liquid crystal panel 240 and a backlight module 300 or 400. The liquid crystal panel 240 includes a liquid crystal layer position between two glass substrates for displaying images (not shown in the figure). The backlight module 300/400 is configured to illuminate the liquid crystal panel 240 and these elements are combined with the front frame 220 to form the liquid crystal display 200.

Figure 3:
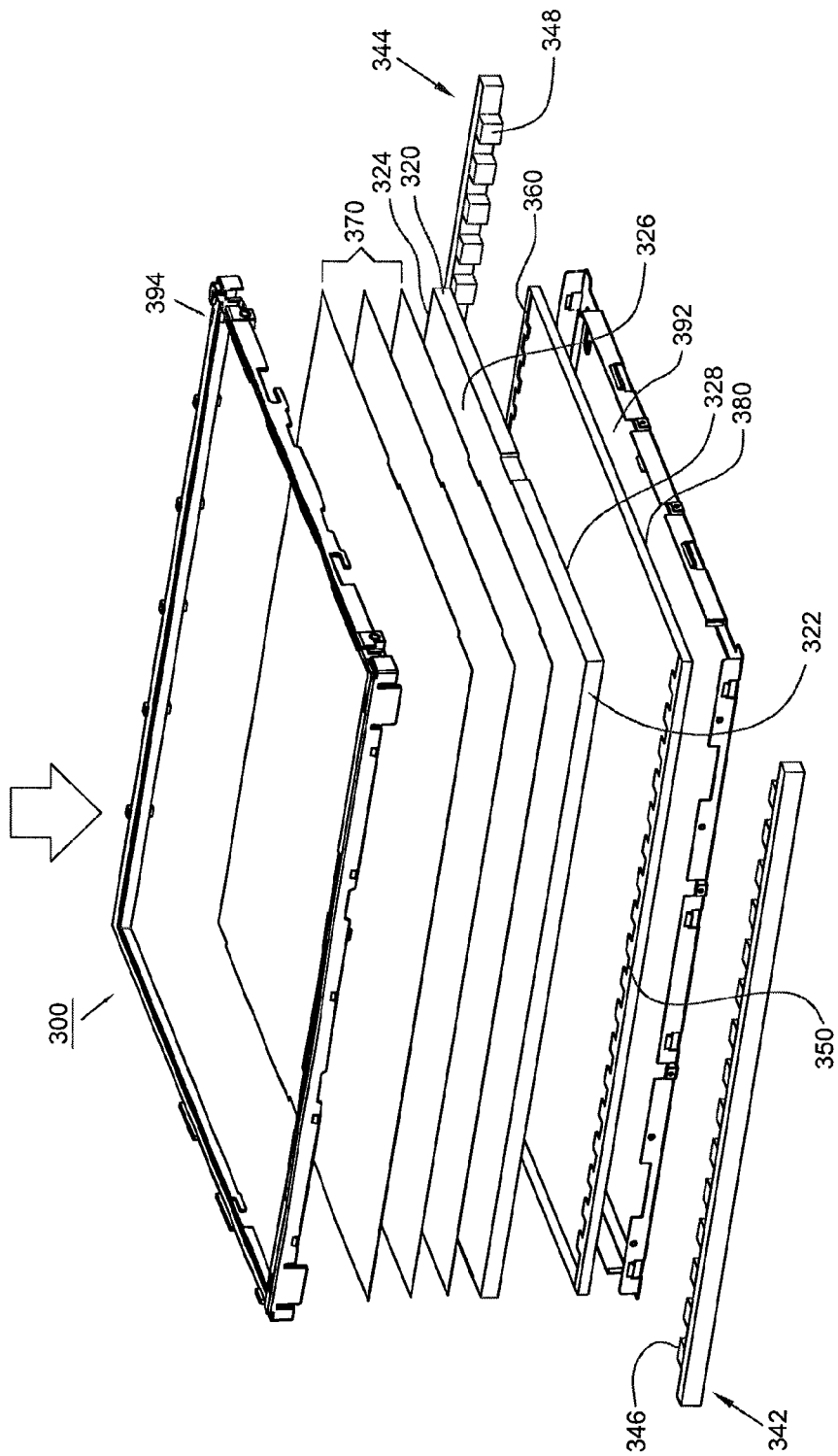
FIG. 3 is a schematic elevated perspective view of the backlight module according to the first embodiment of the present invention.
Figure 4:
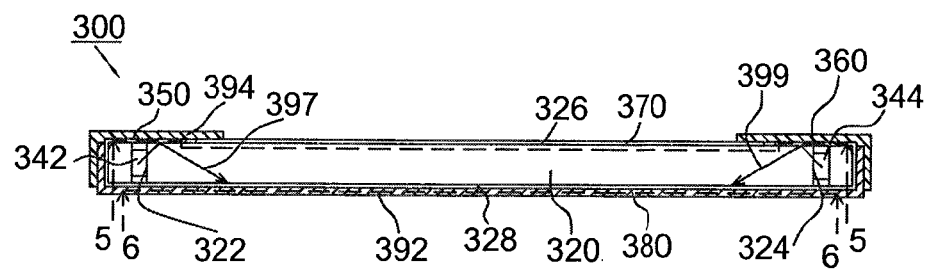
FIG. 4 is a schematic cross-sectional view of the backlight module according to the first embodiment of the present invention.

Referring to FIGS. 3 and 4, the backlight module 300 according to the first embodiment of the present invention includes a light guide plate 320 and a reflection sheet 380. The light guide plate 320 has an upper surface 326, a lower surface 328 and opposing side surfaces 322 and 324. The reflection sheet 380 is positioned under the lower surface 328 of the light guide plate 320. A light source 342 comprising a plurality of point light sources 346 is provided on the side surface 322 of the light guide plate 320 and a light source 344 comprising a plurality of point light sources 348 is provided on the side surface 324 of the light guide plate 320. These light sources 342, 344 can be light bars comprising a plurality of light emitting diodes (LEDs). The reflection layers 350, 360, such as a reflection sheet 380 are positioned above the light sources 342 and 344, respectively and extend to above the upper surface 326 of the light guide plate 320 to reflect light beams emitting from the light sources 342, 344 to the light guide plate 320. The reflection sheets 350, 360 can connect with the reflection sheet 380. In other words, the reflection sheets 350, 360, 380 can be formed by bending a same reflection sheet. Furthermore, an optical film set 370 comprising a plurality of diffusing sheets or prism sheets is positioned above the upper surface 326 of the light guide plate 320 to diffuse the light beams emitting from the light guide plate 320 to the liquid crystal panel 240. The backlight module 300 further includes a back housing 392 and a plastic frame 394. The light guide plate 320, light sources 342, 344, optical film set 370 and reflection sheets 350, 360, 380 are arranged in between the back housing 392 and plastic frame 394.

Figure 5:
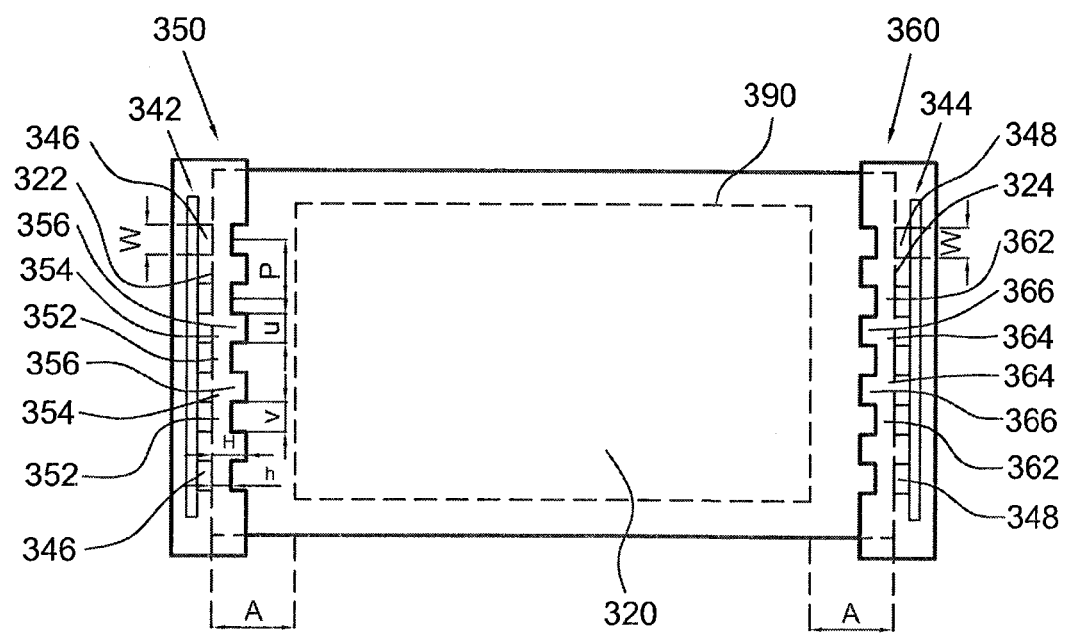
FIG. 5 is a schematic top view taken from the line 5-5 of FIG. 4.

Referring to FIG. 5, the reflection sheet 350 includes a plurality of first portions 352, a plurality of second portions 354 and a plurality of protrusion portions 356, wherein the first portions 352 are positioned corresponding to the point light sources 346 and arranged alternately with the second portions 354. The protrusion portions 356 extend from the second portions 354 toward the side surface 324 of the light guide plate 320. Similarly, the reflection sheet 360 also includes a plurality of first portions 362, a plurality of second portions 364 and a plurality of protrusion portions 366, wherein the first portions 362 are positioned corresponding to the point light sources 348 and arranged alternately with the second portions 364. The protrusion portions 366 extend from the second portions 364 toward the side surface 322 of the light guide plate 320.

Referring to FIGS. 4 and 5 again, the light beams 397 emitting from the light source 342 are reflected to the reflection sheet 380 by the reflection sheet 350 and the light beams 399 emitting from the light source 344 are also reflected to the reflection sheet 380 by the reflection sheet 360. The reflected light beams 397, 399 are focused on the areas of the reflection sheet 380 in front of the light source 342, 344 and these areas are named as "bright areas" accordingly. It will be appreciated that when the reflection sheets 350, 360 extend toward the visible area 390 of the liquid crystal panel 240, these bright areas will also extend toward the visible area 390. When the reflection sheets 350, 360 are shortened and recede from the visible area 390, the bright areas will recede from the visible area 390 accordingly.

Therefore, according to the present invention, the first portions 352 of the reflection sheets 350 can reflect the light beams 397 emitting from the light source 342 to the reflection sheet 380. Since the first portions 352 are relatively short, these reflected light beams are reflected to the areas far away from the visible area 390. Furthermore, the second portions 354 and protrusion portions 356 can also reflect the light beams 397 to the reflection sheet 380. Since the protrusion portions 356 increase the reflection of the light beams 397 to the reflection sheet 380, the areas on the reflection sheet 380 corresponding to the second portions 354 become brighter. Accordingly, the brightness of the dark areas between the bright areas is increased. In consequence, the brightness uniformity on the light-emitting surface of the backlight module 300 is enhanced because the bright areas recede from the visible area 390 and the brightness of the dark areas is increased. This reduces the occurrence of hot spots. As to the reflection sheet 360, it is the same as the reflection sheet 350 in function. The discussion on the reflection sheet 360 is omitted herein.

Figure 6:
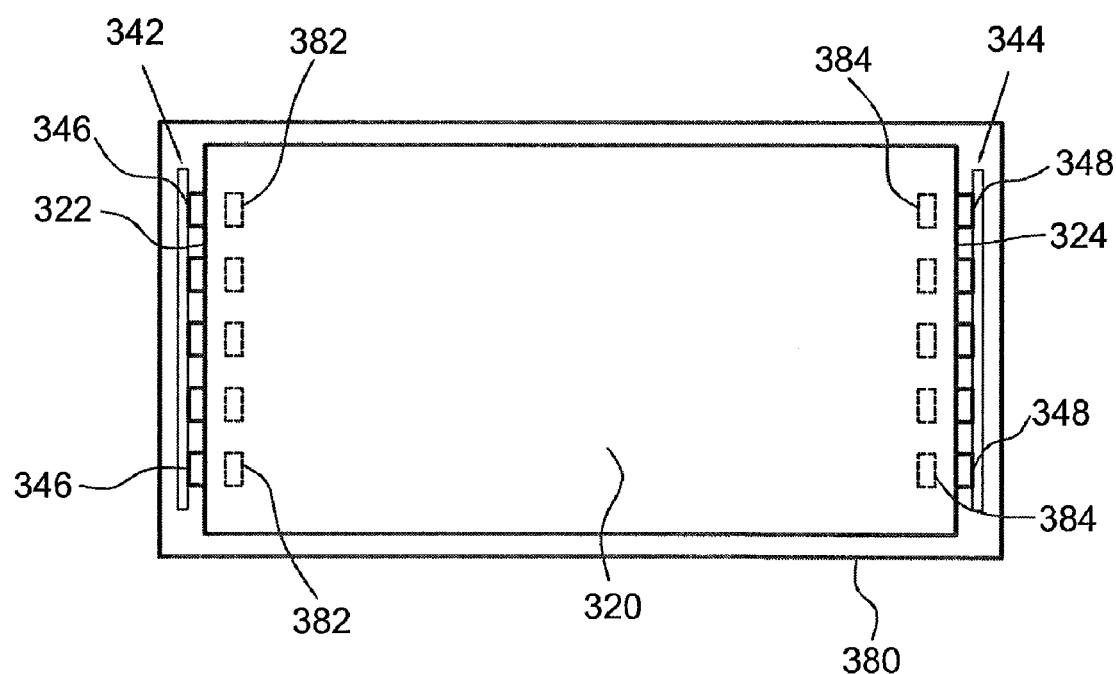
FIG. 6 is a schematic top view taken from the line 6-6 of FIG. 4.

In addition, referring to FIG. 6, to further reduce the occurrence of hot spots, a plurality of openings 382 is arranged in front of the point light sources 346 of the light source 342 on the reflection sheet 380, respectively. These openings 382 are positioned corresponding to the spaces between the protrusion portions 356 of the reflection sheet 350. Similarly, a plurality of openings 384 is arranged in front of the point light sources 348 of the light source 344 on the reflection sheet 380, respectively. The opening 384 are positioned corresponding to the spaces between the protrusion portions 366 of the reflection sheet 360. These openings 382, 384 on the reflection sheet 380 can reduce the brightness of the bright areas thereby decrease the difference in brightness between the bright areas and dark areas. This can help further reduce the occurrence of hot spots.

According to the present invention, the protrusion portions 356, 366 of the reflection sheets 350, 360 can be rectangular, trapezoid, triangular, wave-shaped or fan-shaped. When the protrusion portions 356, 366 are rectangular, the distances from the edges of the visible area 390 to the light-emitting surfaces of the point light sources 346, 348 of the light sources 342, 344 are defined as A. The spacings of the point light sources 346, 348 are defined as P and the widths of the point light sources 346, 348 are defined as W. The distances from the light-emitting surfaces of the point light sources 346, 348 to the edges of the protrusion portions 356, 366 are defined as H and the distances from the light-emitting surfaces of the point light sources 346, 348 to the edges of the first portions 352, 362 are defined as h. The widths of the protrusion portions 356, 366 are defined as u and the widths of the first portions 352, 362 are defined as v. The relations between these parameters are shown as follows, A greater than or equal to 2H;
H greater than or equal to 2h;
v smaller than 0.8W;
u smaller than 3v; and
H substantially equal to the thickness of the light guide plate 320.

Figure 7:
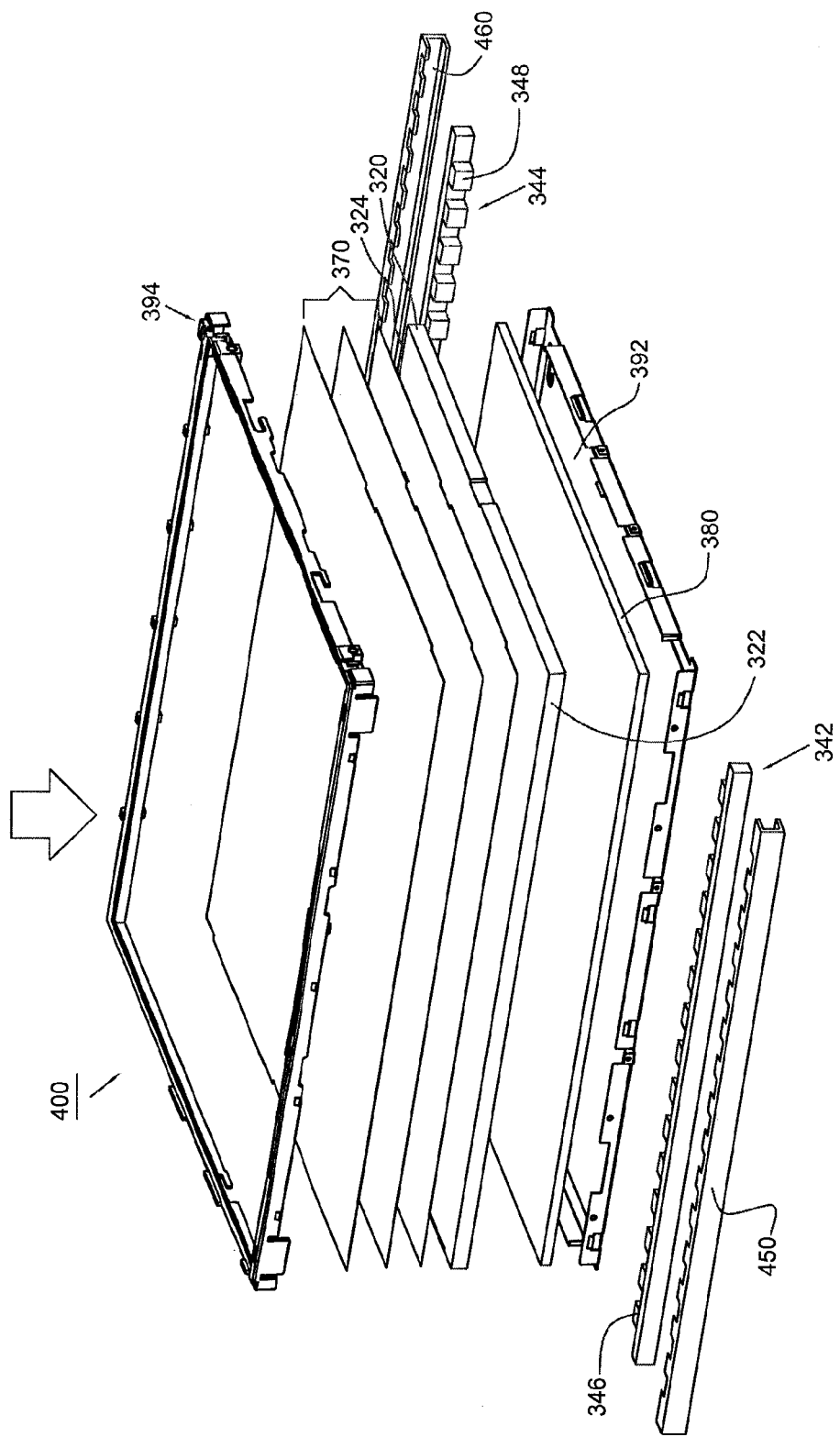
FIG. 7 is a schematic elevated perspective view of the backlight module according to the second embodiment of the present invention.
Figure 8:
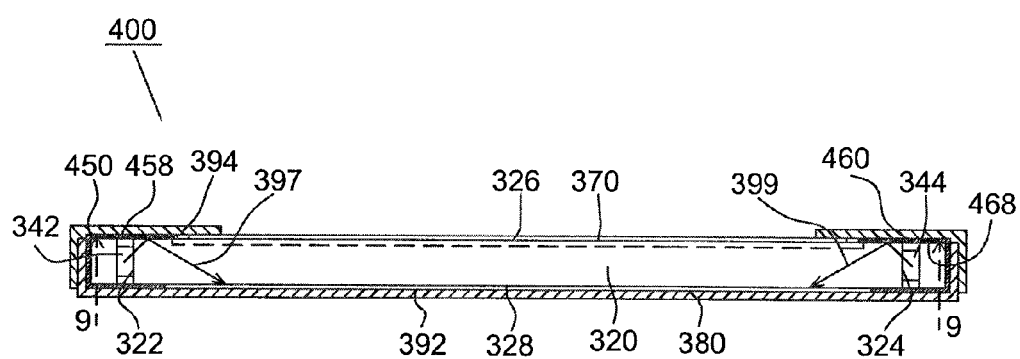
FIG. 8 is a schematic cross-sectional view of the backlight module according to the second embodiment of the present invention.

Referring to FIGS. 7 and 8, the backlight module 400 according to the second embodiment of the present invention is substantially the same as the backlight module 300 of the first embodiment and also includes the light guide plate 320, light sources 342, 344, optical film set 370, reflection sheet 380, back housing 392 and plastic frame 394. However, the backlight module 400 does not include the reflection sheets 350 and 360 configured in the backlight module 300. In comparison with the backlight module 300, the backlight module 400 further includes U-shaped reflectors 450 and 460. The reflector 450 surrounds the light source 342 and has an opening facing the side surface 322 of the light guide plate 320 thereby reflecting the light beams emitting from the light source 342 to the light guide plate 320. The reflector 450 has an upper reflecting surface 458 that is positioned above the light source 342 and extends to above the upper surface 326 of the light guide plate 320. Similarly, the reflector 460 surrounds the light source 344 and has an opening facing the side surface 324 of the light guide plate 320 thereby reflecting the light beams emitting from the light source 344 to the light guide plate 320. The reflector 460 has an upper reflecting surface 468 that is positioned above the light source 344 and extends to above the upper surface 326 of the light guide plate 320. The light guide plate 320, light sources 342, 344, reflectors 450, 460, optical film set 370 and reflection sheet 380 are arranged in between the back housing 392 and plastic frame 394.

Figure 9:
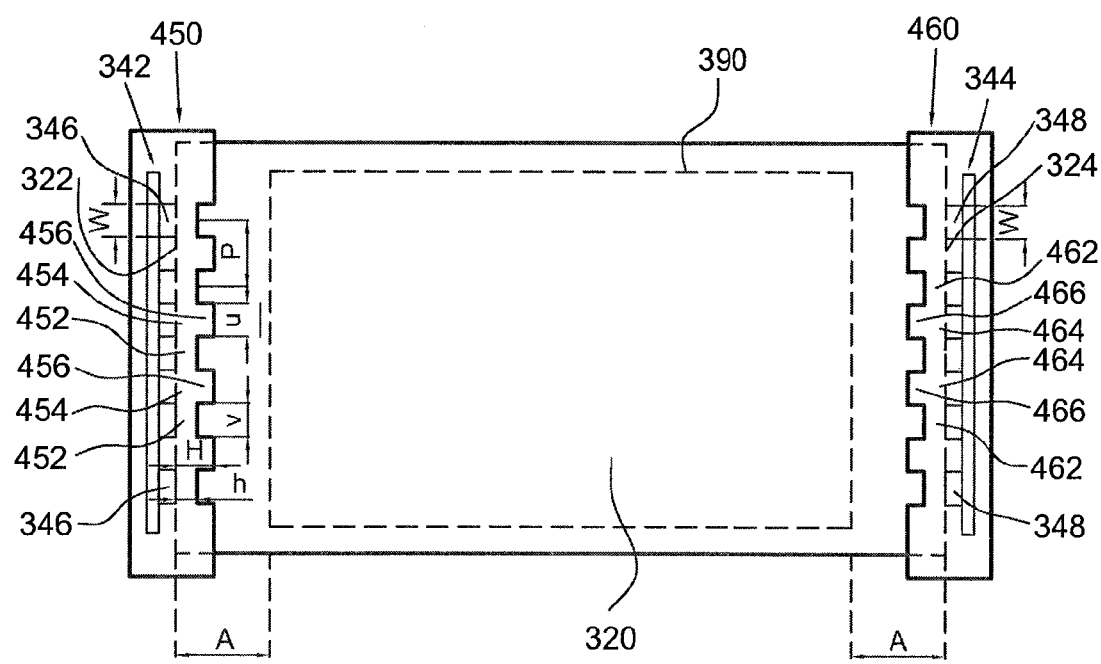
FIG. 9 is a schematic top view taken from the line 9-9 of FIG. 8.

Referring to FIG. 9, the upper reflecting surface 458 of the reflector 450 includes a plurality of first portions 452, a plurality of second portions 454 and a plurality of protrusion portions 456, wherein the first portions 452 are positioned corresponding to the point light sources 346 and arranged alternately with the second portions 454. The protrusion portions 456 extend from the second portions 454 toward the side surface 324 of the light guide plate 320. Similarly, the upper reflecting surface 468 of the reflector 460 also includes a plurality of first portions 462, a plurality of second portions 464 and a plurality of protrusion portions 466, wherein the first portions 462 are positioned corresponding to the point light sources 348 and arranged alternately with the second portions 464. The protrusion portions 466 extend from the second portions 464 toward the side surface 322 of the light guide plate 320.

Since the upper reflecting surfaces 458, 468 of the reflectors 450, 460 have structures the same as the structures of the reflection sheets 350, 360, these elements can also reduce the occurrence of hot spots. Thus, the further discussion on the reflectors 450, 460 is omitted.

According to the present invention, the protrusion portions 456, 466 of the upper reflecting surfaces 458, 468 of the reflectors 450, 460 can be rectangular, trapezoid, triangular, wave-shaped or fan-shaped. When the protrusion portions 456, 466 are rectangular, the distances from the edges of the visible area 390 to the light-emitting surfaces of the point light sources 346, 348 of the light sources 342, 344 are defined as A. The spacings of the point light sources 346, 348 are defined as P and the widths of the point light sources 346, 348 are defined as W. The distances from the light-emitting surfaces of the point light sources 346, 348 to the edges of the protrusion portions 456, 466 of the upper reflecting surfaces 458, 468 are defined as H and the distances from the light-emitting surfaces of the point light sources 346, 348 to the edges of the first portions 452, 462 of upper the reflecting surfaces 458, 468 are defined as h. The widths of the protrusion portions 456, 466 are defined as u and the widths of the first portions 452, 462 are defined as v. The relations between these parameters are shown as follows, A greater than or equal to 2H;
H greater than or equal to 2h;
v smaller than 0.8W;
u smaller than 3v; and
H substantially equal to the thickness of the light guide plate 320.

According to the present invention, the occurrence of hot spots can be reduced by just changing the shapes of the reflection sheets/reflectors and without introduction of extra elements.

Although the occurrence of hot spots can be reduced by changing the shapes of the portions of the reflection sheets/reflectors positioned above the light sources arranged on both sides of the light guide plate according to the first and second embodiments, it should be noted that the occurrence of hot spots can still be reduced by changing the shape of only one of reflection sheets/reflectors.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A backlight module, comprising:
a light guide plate having an upper surface, a lower surface, a first side surface and a second side surface opposite to the first side surface;
a light source positioned on the first side surface of the light guide plate, the light source comprising a plurality of point light sources;
a first reflection sheet positioned above the light source and the upper surface of the light guide plate, adapted to reflect light beams emitting from the light source to the light guide plate, the first reflection sheet having a plurality of first portions, a plurality of second portions and a plurality of protrusion portions, wherein the first portions are positioned corresponding to the point light sources of the light source and arranged alternately with the second portions, the protrusion portions extend from the second portions toward the second side surface of the light guide plate; and
a second reflection sheet positioned under the lower surface of the light guide plate.

2. The backlight module as claimed in claim 1, wherein the second reflection sheet has a plurality of openings arranged in front of the point light sources, respectively and positioned corresponding to the spaces between the protrusion portions of the first reflection sheet.

3. The backlight module as claimed in claim 1, wherein the protrusion portions of the first reflection sheet has a shape selected from the group consisting of trapezoid, triangle, wave shape and fan shape.

4. The backlight module as claimed in claim 1, wherein the protrusion portions of the first reflection sheet are rectangular.

5. The backlight module as claimed in claim 4, wherein the distance from the edge of the visible area of a liquid crystal panel to the light-emitting surfaces of the point light sources is defined as A, the distance from the light-emitting surfaces of the point light sources to the edges of the protrusion portions of the first reflection sheet is defined as H, A is greater than or equal to 2H.

6. The backlight module as claimed in claim 4, wherein the distance from the light-emitting surfaces of the point light sources to the edges of the protrusion portions of the first reflection sheet is defined as H, the distance from the light-emitting surfaces of the point light sources to the edges of the first portions of the first reflection sheet is defined as h, H is greater than or equal to 2h.

7. The backlight module as claimed in claim 4, wherein the distance from the light-emitting surfaces of the point light sources to the edges of the protrusion portions of the first reflection sheet is equal to the thickness of the light guide plate.

8. The backlight module as claimed in claim 4, wherein the width of the first portion of the first reflection sheet is defined as v, and the width of the point light source is defined as W, v is smaller than 0.8W.

9. The backlight module as claimed in claim 4, wherein the width of the first portion of the first reflection sheet is defined as v, and the width of the protrusion portion of the first reflection sheet is defined as u, u is smaller than 3v.

10. A backlight module, comprising:
- a light guide plate having an upper surface, a lower surface, a first side surface and a second side surface opposite to the first side surface;
- a light source positioned on the first side surface of the light guide plate, the light source comprising a plurality of point light sources;
- a reflector surrounding the light source, adapted to reflect light beams emitting from the light source to the light guide plate, the reflector having an upper reflecting surface that is positioned above the light source and the upper surface of the light guide plate, the upper reflecting surface having a plurality of first portions, a plurality of second portions and a plurality of protrusion portions, wherein the first portions are positioned corresponding to the point light sources of the light source and arranged alternately with the second portions, the protrusion portions extend from the second portions toward the second side surface of the light guide plate; and
- a reflection sheet positioned under the lower surface of the light guide plate.

11. The backlight module as claimed in claim 10, wherein the reflection sheet has a plurality of openings arranged in front of the point light sources, respectively and positioned corresponding to the spaces between the protrusion portions of the upper reflecting surface of the reflector.

12. The backlight module as claimed in claim 10, wherein the protrusion portions of the upper reflecting surface of the reflector has a shape selected from the group consisting of trapezoid, triangle, wave shape and fan shape.

13. The backlight module as claimed in claim 10, wherein the protrusion portions of the upper reflecting surface of the reflector are rectangular.

14. The backlight module as claimed in claim 13, wherein the distance from the edge of the visible area of a liquid crystal panel to the light-emitting surfaces of the point light sources is defined as A, the distance from the light-emitting surfaces of the point light sources to the edges of the protrusion portions of the upper reflecting surface of the reflector is defined as H, A is greater than or equal to 2H.

15. The backlight module as claimed in claim 13, wherein the distance from the light-emitting surfaces of the point light sources to the edges of the protrusion portions of the upper reflecting surface of the reflector is defined as H, the distance from the light-emitting surfaces of the point light sources to the edges of the first portions of the upper reflecting surface of the reflector is defined as h, H is greater than or equal to 2h.

16. The backlight module as claimed in claim 13, wherein the distance from the light-emitting surfaces of the point light sources to the edges of the protrusion portions of the upper reflecting surface of the reflector is equal to the thickness of the light guide plate.

17. The backlight module as claimed in claim 13, wherein the width of the first portion of the upper reflecting surface of the reflector is defined as v, and the width of the point light source is defined as W, v is smaller than 0.8W.

18. The backlight module as claimed in claim 13, wherein the width of the first portion of the upper reflecting surface of the reflector is defined as v, and the width of the protrusion portion of the upper reflecting surface of the reflector is defined as u, u is smaller than 3v.

19. A backlight module, comprising:
- a light guide plate having an upper surface, a lower surface, a first side surface and a second side surface opposite to the first side surface;
- a light source positioned on the first side surface of the light guide plate, the light source comprising a plurality of point light sources;
- a first reflection sheet positioned above the light source and the upper surface of the light guide plate, adapted to reflect light beams emitting from the light source to the light guide plate; and
- a second reflection sheet positioned under the lower surface of the light guide plate, having a plurality of openings arranged in front of the point light sources, respectively.

20. A backlight module, comprising:
- a light guide plate having an upper surface, a lower surface, a first side surface and a second side surface opposite to the first side surface;
- a light source positioned on the first side surface of the light guide plate, the light source comprising a plurality of point light sources;
- a reflector surrounding the light source, adapted to reflect light beams emitting from the light source to the light guide plate; and
- a reflection sheet positioned under the lower surface of the light guide plate, having a plurality of openings arranged in front of the point light sources, respectively.

* * * * *